(12) United States Patent
Gronbach

(10) Patent No.: US 8,461,787 B2
(45) Date of Patent: Jun. 11, 2013

(54) ELECTRICAL FULL BRIDGE CIRCUIT CONFIGURATION

(75) Inventor: Roman Gronbach, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 391 days.

(21) Appl. No.: 12/620,791

(22) Filed: Nov. 18, 2009

(65) Prior Publication Data

US 2010/0127645 A1 May 27, 2010

(30) Foreign Application Priority Data

Nov. 19, 2008 (DE) .......................... 10 2008 043 835

(51) Int. Cl.
*H02H 7/085* (2006.01)
*H02P 3/10* (2006.01)

(52) U.S. Cl.
USPC ................. 318/400.21; 318/400.26; 318/293; 361/23

(58) Field of Classification Search
USPC .............. 318/663, 667, 674, 400.26, 400.29, 318/254.2, 294, 280, 293, 535; 361/23
See application file for complete search history.

(56) References Cited

U.S. PATENT DOCUMENTS

| | | | | |
|---|---|---|---|---|
| 5,218,339 A | * | 6/1993 | Schrumpf et al. | ............ 340/439 |
| 5,457,364 A | * | 10/1995 | Bilotti et al. | .................. 318/434 |
| 5,528,444 A | * | 6/1996 | Cooke et al. | ..................... 361/20 |
| 6,043,616 A | * | 3/2000 | Redelberger | ....................... 318/9 |
| 6,906,484 B1 | * | 6/2005 | Berroth et al. | ................. 318/434 |
| 7,397,222 B2 | * | 7/2008 | Cook | .............................. 322/13 |
| 7,459,877 B2 | * | 12/2008 | Cook | ............................ 318/778 |
| 8,222,843 B2 | * | 7/2012 | Crocomo et al. | ........... 318/254.1 |
| 2005/0088126 A1 | * | 4/2005 | Kawashima et al. | .......... 318/434 |
| 2005/0127859 A1 | * | 6/2005 | Kernhof et al. | ................ 318/254 |
| 2005/0200323 A1 | * | 9/2005 | Svobodnik | ..................... 318/254 |
| 2008/0054840 A1 | * | 3/2008 | Cook | ............................ 318/778 |
| 2008/0054857 A1 | * | 3/2008 | Cook | .............................. 322/13 |
| 2008/0315804 A1 | * | 12/2008 | Nishibe et al. | ................. 318/256 |
| 2009/0188361 A1 | * | 7/2009 | Simpson et al. | .................. 83/367 |
| 2010/0315032 A1 | * | 12/2010 | Crocomo et al. | ............. 318/650 |

FOREIGN PATENT DOCUMENTS

| JP | 58107074 A | * | 6/1983 |
|---|---|---|---|
| JP | 07046885 A | * | 2/1995 |
| JP | 07222477 A | * | 8/1995 |
| JP | 2009278803 A | * | 11/2009 |

* cited by examiner

*Primary Examiner* — Eduardo Colon Santana
(74) *Attorney, Agent, or Firm* — Kenyon & Kenyon LLP

(57) ABSTRACT

An electrical full bridge circuit configuration having a bridge circuit, in the bridge branches of which electrical switch elements are situated, and having at least one bridge cross branch for connecting an electric motor that is switchable in its direction of rotation, in particular in an electrical system of a motor vehicle, and having a protective switch element for protecting against inadmissibly high electrical currents, in particular short circuit currents. For this purpose, the switch elements are provided as formed from switch contact elements of at least one relay.

15 Claims, 1 Drawing Sheet

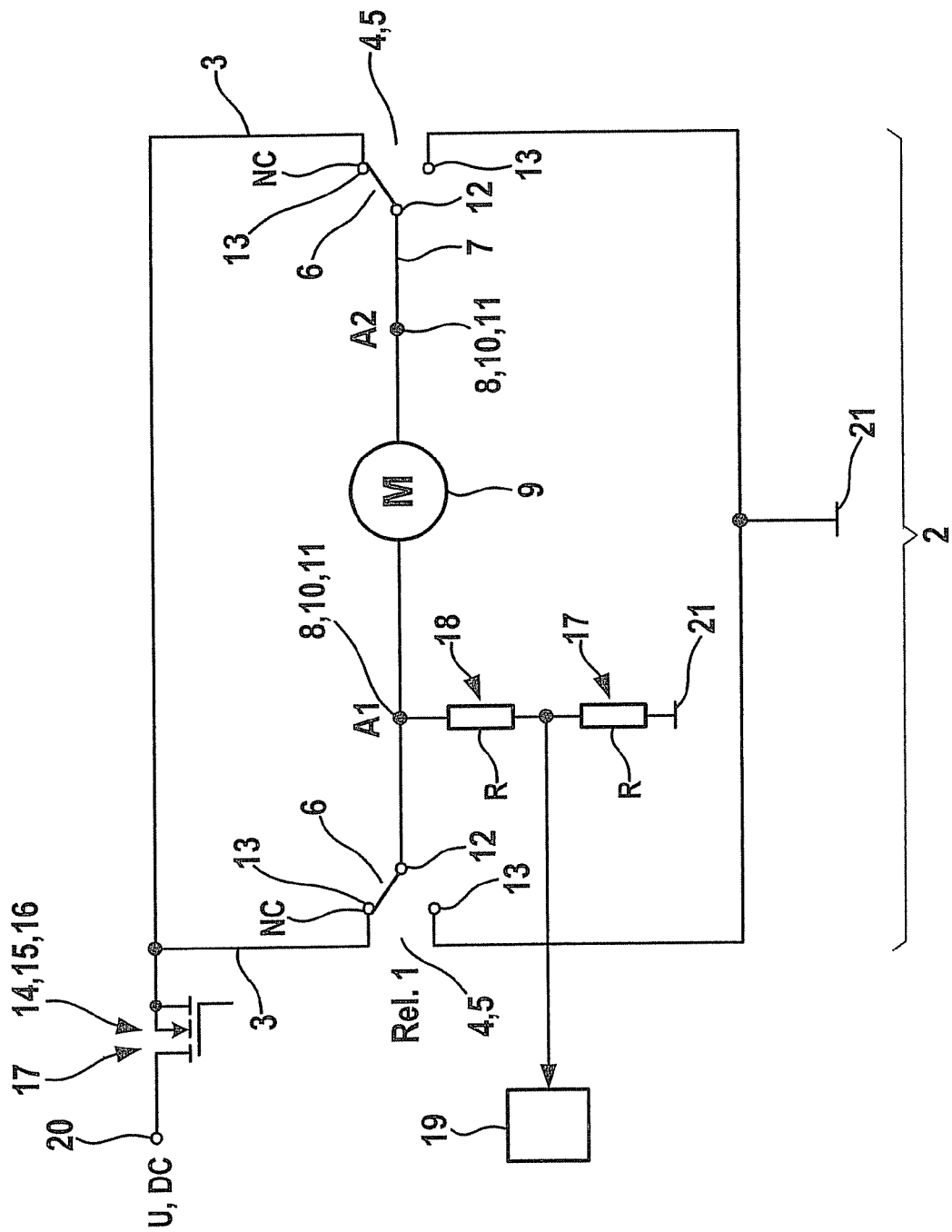

ELECTRICAL FULL BRIDGE CIRCUIT CONFIGURATION

FIELD OF THE INVENTION

The present invention relates to an electrical full bridge circuit configuration having a bridge circuit, in the bridge branches of which electrical switch elements are situated, and having at least one bridge cross branch for connecting an electric motor that is switchable in its direction of rotation, in particular in an electrical system of a motor vehicle, and having a protective switch element for protecting against inadmissibly high electrical currents, in particular short circuit currents.

BACKGROUND INFORMATION

Electric motors that are reversible in their direction of rotation are used in many fields of application, for example in motor vehicles as two-directional pumps for conveying washer fluid of a washer system, as drive motors for door locks and/or door locking mechanisms, drives for roller blinds on side and rear windows, steering column adjustment, seat adjustment. For this purpose, it is customary in the related art to use a transistor full bridge circuit. This is made up of four transistors, which are situated in series in the bridge branches, the motor switchable in its direction of rotation being situated in the bridge cross branch. Another transistor is situated in the mass circuit as reverse polarity protection. In such full bridge circuits, short circuit protection to battery and ground is implemented via the use of so-called smart drivers.

These specific embodiments have the disadvantage of being expensive.

An objective of the present invention is to provide an electrical full bridge circuit configuration of the species, which allows for the desired reversal of the direction of rotation of the electric motor, and which combines a clearly more cost-effective manufacture with an absence of functional limitations compared to the known related art.

SUMMARY OF THE INVENTION

For this purpose, an electrical full bridge circuit configuration is provided, having a bridge circuit, in the bridge branches of which electrical switch elements are situated, and having at least one bridge cross branch for connecting an electric motor that is switchable in its direction of rotation, in particular in an electrical system of a motor vehicle, and having a protective switch element for protecting against inadmissibly high electrical currents, in particular short circuit currents. The present invention provides for the switch elements to be formed from switch contact elements of at least one relay. The switch elements in the bridge branches of the bridge circuit are consequently formed from switch contact elements of at least one relay. Specific embodiments are also possible in which the switch elements are formed from switch contact elements of two relays, which are controlled in parallel for example. Preferably, however, only one relay having two pairs of switch contact elements is used, whereby the transistors of common transistor full bridge circuits may be completely replaced in the bridge branches.

The relay is preferably a changeover relay. In this context, a changeover relay is one that does not switch between the ON and OFF switching states, but rather contacts the input side or the output side alternately, depending on the switching state of the relay. Consequently, one input side is alternately switched to two outputs or one output alternately to two inputs.

In one specific embodiment, the switch contact elements are changeover contact elements, in particular of the changeover relay described above. Changeover contact elements in this context are switch contact elements of the relay, in which a switchover is made between one, the first changeover contact and another, the second changeover contact, while the base remains the same. An input voltage may thus be switched alternately to two outputs.

In another specific embodiment, the bridge cross branch is connected on its ends respectively to a center contact of a changeover contact element. The center contact of the changeover contact element is in this instance the input or output that switches over between two changeover contacts of the relay, that is, applies current to them alternately.

Another specific embodiment provides for the center contact of the changeover contact element to be electrically connectible to a first or a second outer contact depending on the switching position of the changeover relay. Consequently, a switchover is made between the outer contacts as a function of the switching position of the switch relay, while the center contact as the base is consequently electrically connected to the one or the other outer contact.

A direct current supply voltage for the electric motor is preferably connected to the outer contacts. This is intended to mean that the direct current supply voltage for the electric motor is supplied via the outer contacts, and the direct current supply voltage being understood both as positive pole as well as negative pole (ground). There is a provision in particular for the positive pole to be connected to one of the two outer contacts, which are associated with a center contact, and for the negative pole (ground) to be connected to the other outer contact.

Furthermore, in the currentless state, there is a provision for the changeover relay to connect the ends of the bridge cross branch to the same electrical potential, in particular to the positive potential of the supply voltage. In this manner, a high degree of operational reliability is achieved, in which an inadvertent run-up of the electric motor is prevented, and there is a resistance to bypass shorting in the event of damage to a conductor connected to the outer contacts.

Another specific embodiment provides for the protective switch element to be situated electrically in series to the bridge circuit. In particular, the series connection is implemented in such a way that the protective switch element is situated between voltage source (positive pole) and first bridge branch.

The protective switch element preferably has a semiconductor switch.

Particularly preferably, the protective switch element has a MOSFET transistor.

In another, particularly preferred specific embodiment, the protective switch element takes the form of a smart driver. Such a smart driver is in principle known in the related art. When unexpectedly or inadmissibly high currents exist, it performs a disconnection via an integrated current measuring device such that the current flow is instantly interrupted before the electrically post-connected device is damaged.

In another preferred specific embodiment, a voltage divider branches off from the bridge cross branch, which is used in particular for voltage measurement. Via this voltage divider, for example via a controller electrically connected to the voltage divider, it is possible to monitor the voltage drop. If the latter exceeds an expected value, then a short circuit behavior may be assumed, namely, when in a bridge branch or in the bridge cross branch there is a short circuit to the positive pole of the direct current supply voltage. A short circuit to ground is detected and intercepted for example via the protective switch element connected in series. A short circuit to the positive voltage pole is detected via the voltage divider, in particular by a controller, electrically post-connected to the voltage divider, for monitoring the voltage drop on the voltage divider. The latter is accordingly able to effect a disconnection and protect the electrical system against damage.

Particularly preferably, the bridge cross branch has motor terminals, to which the electric motor is connected, one voltage divider being connected to each motor terminal. In this manner, each side of the electric motor may be monitored with respect to a short circuit to the positive pole of the direct current supply voltage.

BRIEF DESCRIPTION OF THE DRAWING

The FIGURE shows a full bridge circuit configuration including the wiring of an electric motor reversible in its direction of rotation.

DETAILED DESCRIPTION

The FIGURE shows an electrical full bridge circuit configuration 1 having a bridge circuit 2, in the bridge branches 3 of which there are electrical switch elements 4, which are developed as switch contact elements 5 of a relay 6. Bridge circuit 2 has a bridge cross branch 7, in which an electric motor 9 reversible in its direction of rotation is electrically connected for its voltage supply to a supply voltage U via motor terminals 8. Motor terminals 8 are preferably developed either as detachable terminals 10, for example as plug connectors, or as soldered connections 11. The development as soldered connections 11 is useful particularly in cases in which full bridge circuit configuration 1 is connected to electric motor 9 to form a module. Switch contact elements 5 of relay 6 each have one center contact 12, which is in each case electrically connected to bridge cross branch 7, in which motor terminals 8 are located. Furthermore, switch contact elements 5 of relay 6 each have two outer contacts 13, which are alternately supplied with current by center contact 12, depending on the switching position of relay 6. Outer contacts 13 are situated in the two bridge branches 3 in such a way that bridge branches 3 are electrically interrupted and that outer contacts 13, respectively located at the end on the interruption point, are alternately connected to the respective center contact 12 via relay 6 as a function of its switching position. Relay 6 is thus developed as a changeover relay 22, switch contact elements 5 being changeover contact elements 23.

Electric motor 9 may be switched in its direction of rotation by the fact that supply voltage U is applied either to a first supply voltage terminal A1 or to a second supply voltage terminal A2 (respectively motor terminals 8), in each case either the first supply voltage terminal A1 being connected to supply voltage U and second supply voltage terminal A2 accordingly to ground, or vice versa. The direction of rotation of electric motor 9 is determined depending on whether supply voltage U is connected to first supply voltage terminal A1 or to second supply voltage terminal A2, while the respectively other supply voltage terminal is connected to ground. Supply voltage U is preferably a direct current supply voltage DC.

A protective switch element 14 is situated in series to bridge circuit 2 and has a MOSFET transistor 15 as, or having, semiconductor switch 24 and is developed in particular as a smart driver 16. Smart driver 16 has an integrated current measuring device, which, in the event of an unexpectedly high current, in particular a short circuit current, disconnects bridge circuit 2 from the supply voltage U and thereby prevents damage to the electrical network providing supply voltage U, in particular the electrical system of a vehicle, as well as to bridge circuit 2 and the electrical and/or electronic components comprised by it or associated with it, in particular relay 6 and electric motor 9. Protective switch element 14 acts in this instance especially as a short circuit protection 17.

As a further short circuit protection 17, in this case connected to first supply voltage terminal A1, a voltage divider 18 is provided, which connects first supply voltage terminal A1 to ground via two resistors R. In voltage divider 18, a controller 19 is electrically connected, which switches off supply voltage U via a suitable switching system (not shown here) in the event of an unexpected voltage drop on voltage divider 18 in order to protect full bridge circuit system 1. In preferred specific embodiments, such a voltage divider 18 with connection to another controller 19 or to the same controller 19 may also be connected to the second supply voltage terminal A2: This arrangement of voltage dividers 18 and controller(s) 19 prevents relay 6 from being switched in an undesired way to supply voltage U in the event of a short circuit. While full bridge circuit configuration 1 is in operation or in particular prior to operating electric motor 9, controller 19 may test for proper absence of a short circuit by measuring the expected voltage drop in voltage divider 18.

Voltage divider 18 is advantageously developed to have such low resistance that the sum of resistances R acts like a pull-down resistor to ground, which allows for a reliable detection of short circuits in spite of possibly existing resistances to other voltage potentials.

As already mentioned, smart driver 16 also performs a current measurement and test of the connected load, whereby a short circuit to ground, for example on the first and second supply voltage terminals A1, A2, may be detected and controlled. Of outer contacts 13 of relay 6, only the contact situated in bridge circuit 3 on the side of supply voltage U or of smart driver 16 is developed as a break contact NC. As a result, supply voltage terminals A1, A2 are connected only in highly resistive fashion and a short circuit to U in the switched-off state is non-critical. If the polarity of full bridge circuit configuration 1 is reversed, this choice of break contacts NC makes an undesired current flow in the reverse direction impossible.

The shown essentially electromechanically designed full bridge circuit configuration implements the change of the direction of rotation of electric motor 9 in a cost-effective manner using a preferably two-pole relay 6. The full bridge circuit configuration known from the related art having at least four intelligent semiconductor switches may thus be replaced by a more cost-effective, more reliable, essentially electromechanical full bridge circuit configuration 1. Preferably, full bridge circuit configuration 1 may be developed in a modular construction with respect to the electric motor 9 that is to be connected, in which case only one supply voltage connecting point 20 and one ground connecting point 21, preferably as a plug connection customary in the related art, have to be provided as interface to the outside.

What is claimed is:
1. An electrical full bridge circuit configuration comprising:
  a bridge circuit including bridge branches, electrical switch elements situated in the bridge branches, and at least one bridge cross branch for connecting an electric motor that is switchable in its direction of rotation, the switch elements being formed from switch contact elements of at least one relay;

a protective switch element for protecting against inadmissibly high electrical currents; and at least one voltage divider branching off from the bridge cross branch, for voltage measurement, wherein the relay is a changeover relay, wherein at its ends the bridge cross branch is respectively connected to a center contact of the switch contact element.

2. The full bridge circuit configuration according to claim 1, wherein the switch contact elements are changeover contact elements.

3. The full bridge circuit configuration according to claim 2, wherein the center contact of the changeover contact element is electrically connectible as a function of a switching position of the changeover relay to a first or second outer contact.

4. The full bridge circuit configuration according to claim 3, wherein a direct current supply voltage for the electric motor is connected to the outer contacts.

5. The full bridge circuit configuration according to claim 4, wherein in a currentless state the changeover relay connects the ends of the bridge cross branch to the positive potential of the supply voltage.

6. The full bridge circuit configuration according to claim 3, wherein only one of the first and second contacts is a break contact.

7. The full bridge circuit configuration according to claim 6, wherein the break contact is the one of the first and second contacts that is situated on a side of a supply voltage.

8. The full bridge circuit configuration according to claim 1, wherein the protective switch element is situated electrically in series to the bridge circuit.

9. The full bridge circuit configuration according to claim 1, wherein the protective switch element has a semiconductor switch.

10. The full bridge circuit configuration according to claim 1, wherein the protective switch element has a MOSFET transistor.

11. The full bridge circuit configuration according to claim 1, wherein the protective switch element is a smart driver.

12. The full bridge circuit configuration according to claim 1, wherein the bridge cross branch has motor terminals, and one voltage divider is connected to each motor terminal.

13. The full bridge circuit configuration according to claim 1, wherein the electric motor is in an electrical system of a motor vehicle.

14. The full bridge circuit configuration according to claim 1, wherein the protective switch element protects against short circuit currents.

15. An electrical full bridge circuit configuration comprising:

a bridge circuit including bridge branches, electrical switch elements situated in the bridge branches, and at least one bridge cross branch for connecting an electric motor that is switchable in its direction of rotation, the switch elements being formed from switch contact elements of at least one relay;

a protective switch element for protecting against inadmissibly high electrical currents; and at least one voltage divider branching off from the bridge cross branch, for voltage measurement, wherein the relay is a changeover relay.

\* \* \* \* \*